(12) United States Patent
Bonner (10) Patent No.: US 10,255,894 B1
(45) Date of Patent: Apr. 9, 2019

(54) WEARABLE ELECTRONIC MUSICAL INSTRUMENT

(71) Applicant: Mark J. Bonner, Watertown, NY (US)

(72) Inventor: Mark J. Bonner, Watertown, NY (US)

( * ) Notice: Subject to any disclaimer, the term of this patent is extended or adjusted under 35 U.S.C. 154(b) by 0 days.

(21) Appl. No.: 15/679,457

(22) Filed: Aug. 17, 2017

Related U.S. Application Data (63) Continuation-in-part of application No. 15/381,434, filed on Dec. 16, 2016.

(60) Provisional application No. 62/451,894, filed on Jan. 30, 2017.

(51) Int. Cl.
*G10H 1/34* (2006.01)
*G06F 3/01* (2006.01)
*G06F 3/02* (2006.01)

(52) U.S. Cl.
CPC .............. *G10H 1/34* (2013.01); *G06F 3/014* (2013.01); *G06F 3/02* (2013.01); *G10H 2220/326* (2013.01); *G10H 2240/005* (2013.01); *G10H 2240/201* (2013.01)

(58) Field of Classification Search
CPC .............. G10H 1/34; G10H 2220/326; G10H 2240/005; G10H 2240/201; G06F 3/014; G06F 3/02
USPC ............................................................. 84/3
See application file for complete search history.

(56) References Cited

U.S. PATENT DOCUMENTS

| | | |
|---|---|---|
| 2,002,144 A | 5/1935 | Heaton |
| 2,511,557 A | 6/1950 | Arnold |
| 3,226,754 A | 1/1966 | Brittain |
| 3,591,298 A | 7/1971 | Green |
| D253,010 S | 9/1979 | Gueret et al. |
| 4,177,698 A | 12/1979 | Greneker |
| D254,035 S | 1/1980 | Gueret et al. |
| 4,213,472 A | 7/1980 | Gueret et al. |
| 4,414,537 A * | 11/1983 | Grimes ................ A61B 5/1114 341/20 |

(Continued)

FOREIGN PATENT DOCUMENTS

JP H05150771 6/1993

OTHER PUBLICATIONS

File History for U.S. Pat. No. 7,674,969 Issued Mar. 9, 2010.

(Continued)

*Primary Examiner* — David Warren
*Assistant Examiner* — Christina Schreiber (57) ABSTRACT

Disclosed is a wearable electronic music system including a plurality of first finger mountable implements, each having at least one surface engageable element operatively connected thereto. The system further includes a second finger mountable implement with a state altering element being disposable in a first state or a second state. A sound producing subsystem operatively communicates with the plurality of first finger mountable implements and the second finger mountable implement. In operation, when the state altering element is disposed in the first state, the sound producing subsystem causes a first output to be produced when at least one of said plurality of first finger mountable implements contacts the solid surface, and when the state altering element is disposed in the second state, the sound producing subsystem causes a second output to be produced as the at least one of said plurality of first finger mountable implements contacts the solid surface.

20 Claims, 8 Drawing Sheets

(56) References Cited

U.S. PATENT DOCUMENTS

| | | | | |
|---|---|---|---|---|
| 4,613,139 | A * | 9/1986 | Robinson, II | G06F 3/014 200/DIG. 2 |
| 4,621,935 | A | 11/1986 | Sussman | |
| 4,635,516 | A * | 1/1987 | Giannini | G10H 1/32 2/160 |
| 4,681,012 | A * | 7/1987 | Stelma | G10D 13/06 2/160 |
| 4,915,234 | A | 4/1990 | Boeller | |
| 5,029,508 | A * | 7/1991 | Suzuki | G10H 1/34 84/616 |
| 5,046,394 | A * | 9/1991 | Suzuki | G10H 1/0553 250/227.14 |
| 5,151,553 | A * | 9/1992 | Suzuki | G10H 1/0558 341/20 |
| 5,166,463 | A * | 11/1992 | Weber | G10H 1/00 84/600 |
| 5,216,193 | A * | 6/1993 | Masubuchi | G10H 1/0558 338/99 |
| D339,235 | S | 9/1993 | Hirzel | |
| 5,338,891 | A * | 8/1994 | Masubuchi | G10H 1/0558 84/600 |
| 5,512,703 | A * | 4/1996 | Usa | G10H 1/0558 84/600 |
| 5,571,020 | A * | 11/1996 | Troudet | G09B 5/065 2/160 |
| 5,581,484 | A * | 12/1996 | Prince | G06F 3/014 340/407.1 |
| 5,944,434 | A | 8/1999 | Schlatter | |
| 6,262,355 | B1 * | 7/2001 | Koch | G10H 1/34 84/600 |
| 6,304,840 | B1 * | 10/2001 | Vance | G06F 3/014 703/21 |
| 6,587,090 | B1 * | 7/2003 | Jarra | G06F 3/033 345/156 |
| 6,734,349 | B1 * | 5/2004 | Adams | G10D 13/003 84/315 |
| 6,885,316 | B2 * | 4/2005 | Mehring | G06F 3/014 341/21 |
| 7,214,336 | B2 | 5/2007 | Sheridan et al. | |
| 7,381,884 | B1 * | 6/2008 | Atakhanian | G10H 1/34 84/477 R |
| 7,674,969 | B2 * | 3/2010 | Xu | G10H 1/24 84/615 |
| 7,842,879 | B1 * | 11/2010 | Carter | G10H 3/143 84/600 |
| 8,362,350 | B2 * | 1/2013 | Kockovic | G10H 1/34 84/743 |
| 8,662,091 | B2 | 3/2014 | Jang | |
| 9,905,207 | B2 * | 2/2018 | Louhivuori | G10H 1/0008 |
| 9,959,854 | B2 * | 5/2018 | Sims | G10H 3/146 |
| 2004/0112204 | A1 * | 6/2004 | Javelle | G10H 1/34 84/645 |
| 2006/0171758 | A1 * | 8/2006 | Kleve | G06F 3/0219 400/489 |
| 2009/0101163 | A1 | 4/2009 | Brunner | |
| 2011/0142528 | A1 | 6/2011 | Charlton | |
| 2011/0209599 | A1 * | 9/2011 | Aponte | G10H 1/0008 84/723 |
| 2013/0169420 | A1 * | 7/2013 | Blount, Jr. | G06F 3/014 340/12.5 |
| 2016/0175186 | A1 * | 6/2016 | Shadduck | A61H 19/34 601/15 |
| 2017/0025106 | A1 * | 1/2017 | Bucak | G10H 1/055 |
| 2017/0262060 | A1 * | 9/2017 | Katsuki | G06F 3/038 |
| 2017/0308166 | A1 * | 10/2017 | Mallinson | G06F 3/014 |

OTHER PUBLICATIONS

"Gest: Work With Your Hands," Gest-Kickstarter, https://www.kickstarter.com/projects/asdffilms/gest-work-with-your-hands; Mar. 8, 2017; 20 pages.

"MusicGlove Hand Rehabilitation System," MedGadget (http://www.medgadget.com), http://www.medgadget.com/2014/10/musicglove-hand-rehabilitation-sys . . . Mar. 8, 2017, 7 pages.

"Sound on Intuition Translates Body Movements Into Music," Antoine Carbonnaux; https://motherboard.vice.com/en_us/article/sound-on-intuition-translates-body-motion-into, Mar. 8, 2017, 8 pages.

Fingertip sensor musical switch wearable, Google Search; https://www.google.com/search?q=fingertip+sensor+musical+switch+wearable&sa=N&espv=2&biw=1920&bih., May 3, 2017, 13 pages.

"Raspberry Pi Music Fingers," Carmellitio Andrade, http://www.instructables.com/id/Raspberry-Pi-Music-Fingers/?ALLSTEPS,Mar. 8, 2017, 20 pages.

"Sound intuition: This technology will turn your movements into music," by Holden Frith, http://www.cnn.com/2013/08/21/tech/innovation/sound-intuition-this-technology/, Aug. 21, 2013, 3 pages.

* cited by examiner

WEARABLE ELECTRONIC MUSICAL INSTRUMENT

Priority is claimed under 35 U.S.C. § 119(e) from U.S. Provisional Patent Application No. 62/451,894 for a Finger Mounted Musical Keyboard, filed Jan. 30, 2017 by the same applicant, and this application is a continuation-in-part of co-pending U.S. patent application Ser. No. 15/381,434, filed on Dec. 16, 2016 by the same applicant, and the disclosures of both applications are hereby incorporated by reference in their entirety.

The present disclosure relates to electronic musical instruments and more particularly to a wearable electronic musical system in which input from specially designed finger mountable implements is used to produce selected musical sounds.

BACKGROUND AND SUMMARY

Keyboard instruments existed as early as the third century BC where the Ancient Greeks used a type of pipe organ known as the "hydraulis." The piano, which began to gain widespread popularity as early as the $18^{th}$ century, saw considerable improvement, in design, throughout the $19^{th}$ century. While it was not uncommon, even in the $20^{th}$ century, to have an upright piano, or even grand, piano, in a home, the popularity of the piano, due to its inherent bulkiness, has diminished in popularity (in terms of consumer demand).

Electric pianos, first developed in the early $20^{th}$ century, used metal strings with a magnetic pickup, an amplifier and a loudspeaker. By the beginning of the $21^{st}$ century, electric piano technology had evolved to hybrid variations such as the "electronic keyboard." An electronic keyboard, typically including a keyboard used in conjunction with a synthesizer (including a power amplifier) and small loudspeakers, is capable of recreating a wide range of musical sounds.

The dynamic range of the electronic keyboard has been greatly increased through use of the musical instrument digital interface (MIDI)—a standard for digital code transmission and digital technology development. When the electronic keyboard is used as a MIDI controller, MIDI data (including, for instance, information about note pitch, as well as duration) can be used to trigger sounds from a sound module or synthesizer. Capability of the electronic keyboard, when used in the context of a MIDI controller, can be greatly enhanced by use with a computer executing one or more software applications.

A current trend in music composition includes adapting the electronic keyboard into a wearable musical instrument. Each of the following patents at least relates to a wearable musical apparatus usable with a pair of hands:

U.S. Pat. No. 5,029,508 discloses a musical-tone-control apparatus having finger sensors that detect the bending of each finger and produce on/off signals in response to the bending. One group of outputs of the finger sensors is converted into keycodes that control tone pitches by the use of converting rules, and the other group of the outputs thereof is also used for changing the ranges of the tone pitches. Hence, musical tones controlled by finger motions of a performer are generated. Moreover, the converting rules can be altered by a modification-control means so that keycode-conversion rules can be varied. Thus, conversion rules appropriate for generating tones which occur frequently and are easy to produce for an individual, can be set for each musical piece. Furthermore, grouping the outputs of finger sensors makes it possible for a performer to achieve a variety of control of musical tones.

U.S. Pat. No. 7,381,884 discloses a glove including a body that is positional about a user's hand. Speakers are embedded within the body and are coupled to an amplifier. Mechanisms are included for sensing external forces on each finger and for generating control signals when the external forces are detected. Each control signal includes an embedded digital data stream identifying an intensity and a time interval of the external forces. A mechanism is included for calculating a signal pattern corresponding to the control signal data streams. The signal pattern has the identical intensity and time interval characteristics of the external forces. LEDs are coupled to the signal pattern calculating mechanism. A mechanism is included for emitting musical sounds based upon the calculated signal pattern such that the audible musical sounds match the intensity and time interval of the signal pattern. The audible musical sound emitting mechanism includes an amp and a switch coupled thereto.

U.S. Pat. No. 7,674,969 discloses a finger musical instrument, including a first glove and a second glove, some performance keys distributed on a fingertip of each of the gloves, and a sound box positioned at each of the gloves. The finger musical instrument further includes a combination key positioned at palm heel of each of the gloves. Each of the sound boxes is connected with a controller. The performance key and the combination key on the same glove are all connected with the corresponding controller. Therein the performance key and the combination of the performance key and the combination key of one glove gives out one octave sound, while the performance key and the combination of the performance key and the combination key of the other glove gives out another octave sound. Each of the controllers is provided with a range regulation switch used for making a sound higher or lower by an octave on each of the gloves. With regulation of the range regulation switch, the finger musical instrument is able to give out a range of two octaves through the sound box.

U.S. Pat. No. 7,842,879 discloses a touch sensitive impact controlled signal transfer device used as a musical glove device that sends electrical signals to a sound module when areas of the glove containing piezoelectric discs are tapped or otherwise impacted on a surface. The force applied by impact to the piezoelectric disc or discs is interpreted by the sound module and the module produces a sound at a volume level directly related to the force of impact on the piezoelectric discs. Multiple piezoelectric disks are located in each glove allowing a plurality of sounds by tapping different areas of the glove, such as the palm, thumb and fingers.

U.S. Pat. No. 8,362,350, includes a comprehensive discussion of the prior art corresponding with wearable musical instruments, some of which include the use of sensors at the fingertips. The '350 Patent discloses a wearable trigger electronic music system that can simulate any kind of music, anywhere and at any time. For example, one can create all the benefits of the percussion instrument, such as a drum kit, without its cost and burden. The same also applies to string, wind, and other types of instruments of any nation, culture, motif, era, age, etc. The system includes constituent components, including sensors, transducers, electronics, music modules, pre-amps, and amplifiers, wired or wireless, with connections for intra- and inter-modules, including final enjoyment by wired or wireless headphones or speakers. Also delineated is the process of creating music for the DIY enthusiast.

JPH05150771 discloses an electronic musical instrument which can easily be played by providing a controller which generates an audio signal corresponding to the detection data of a depression sensor fitted on a fingertip. Referring more particularly to the bibliographic data for the subject patent, touch switches 1a-1e, and 2a-2e are stuck on the tips of left and right gloves 1 and 2. A player wears the gloves 1 and 2 on the left and right hands and presses the top of a desk to play desired music. The kind of the pressed finger and the pressing time are sent to a microcomputer 4 through a reception part 3, and data for sound source generation are generated there. The data are sent to a sound source part 5 and inputted to the base of the transistor of a VCA 6 as an input signal corresponding to the frequency of the sound corresponding to the finger tip and the pressing time. The output of the VCA 6 is amplified by a power amplifier 8 and outputted as a musical sound from a speaker.

The disclosures of the above-described patents are incorporated herein by reference.

Each of the following U.S. patents and U.S. patent application publication, the disclosures of which are incorporated herein by reference, may include at least one teaching relating the area of wearable musical technology: U.S. Pat. No. 5,581,484; U.S. Pat. No. 6,304,840; U.S. Pat. No. 6,587,090; U.S. Pat. No. 6,885,316; and U.S. Patent Application Publication No. 2006/0171758.

For example, the wearable musical glove of U.S. Pat. No. 7,674,969 discloses the use of range selection switch, in conjunction with combination and performance keys, to increase octave range. It should be appreciated, however, that this increase in octave or dynamic range comes at the expense of complexity in system usage since each combination key is positioned at a palm heel of a glove, while each range switch appears to be part of (or at least in close proximity to) a sound box at a wrist portion of the glove. Thus, multiple system elements, associated with various parts of a hand, other than the fingers, must be engaged in order to achieve the increased dynamic range. It would desirable to achieve increased dynamic range in the area of wearable electronic musical instrumentation by providing a system that possesses a simple, yet robust design, that is easy to access and use.

In accordance with a first aspect of the present specification, there is disclosed a wearable electronic music system including finger mountable implements for at least two fingers. In one example, a switch is mounted to each finger mountable implement and the finger mountable implements operatively communicate with a sound producing subsystem by way of an interface, such as an ASIC. By selectively changing states of the switch on the one finger element, one of several different outputs can be obtained when the other finger mountable implement is brought into contact with a solid surface. In another example, the switch for one or more finger implements (or alternatively a sensor) can assume one of various forms ranging from a multi-position switch to a switch using a movable member, such as a roller switch. In yet another example, one of the other finger mountable implements is configured to reflect note duration in response to how quickly that finger implement is brought into contact with the solid surface. In another example, the one finger mountable implement is secured to a thumb while the other finger mountable element is secured to a finger other than the thumb. In this way, an output selection for the finger other than the thumb can be made by, for instance, tapping the switch of the thumb prior to contacting the solid surface with the finger other than the thumb.

In accordance with the first aspect of the present specification, the finger mountable implements may be configured as a musical instrument digital interface (MIDI) controller, the MIDI controller operatively communicating with a synthesizer. In response to setting a switch operatively associated with one finger mountable implement and contacting a solid surface with another finger mountable implement, MIDI Messages are communicated to the synthesizer for generating musical output.

In accordance with a second aspect of the present specification, there is disclosed a wearable user input device for selectively producing a first musical output and a second musical output. In one example, at least three finger mountable implements are provided for three respective digits with the first implement being configured to selectively generate first and second signals. Responsive to generation of the first signal, the first musical output is produced when the second and third implements are brought into contact with a solid surface and, responsive to generation of the second signal, the second musical output is produced when the second and third implements are brought into contact with the solid surface

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted

DETAILED DESCRIPTION

Figure 1:
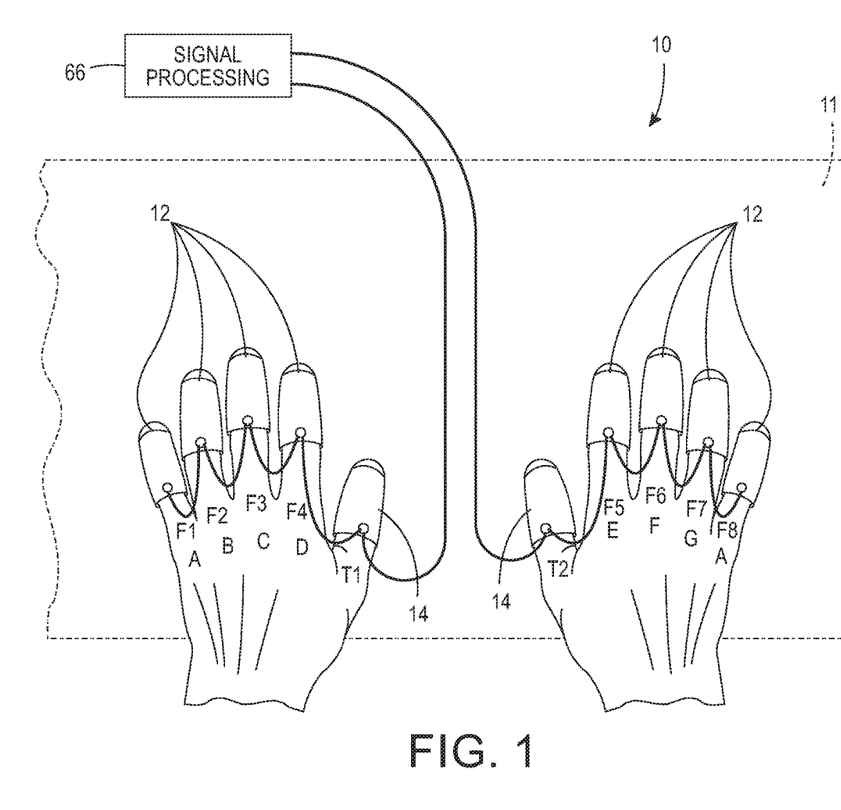
FIG. 1 is a schematic, planar view of a wearable electronic musical system.

Referring to FIG. 1, a wearable electronic musical system is designated with the numeral 10. The system 10 includes a controller the controller being designated by the numeral 11 and, in one example, the controller 11 comprises a musical instrumental digital interface ("MIDI") controller, communicating with a signal processing system 66, the signal processing system 66 being described in detail below. The controller 10 comprises finger mountable subsystems 12 and 14. In one embodiment, each subsystem 12 is configured for use with a fingertip and each subsystem 14 is configured for use with a thumb tip. It should be appreciated, however, that at least one of subsystems 12 could be used with a thumb, and at least one of subsystems 14 could be used with a finger without altering the purpose for which the presently disclosed wearable electronic musical system is intended.

Figure 2:
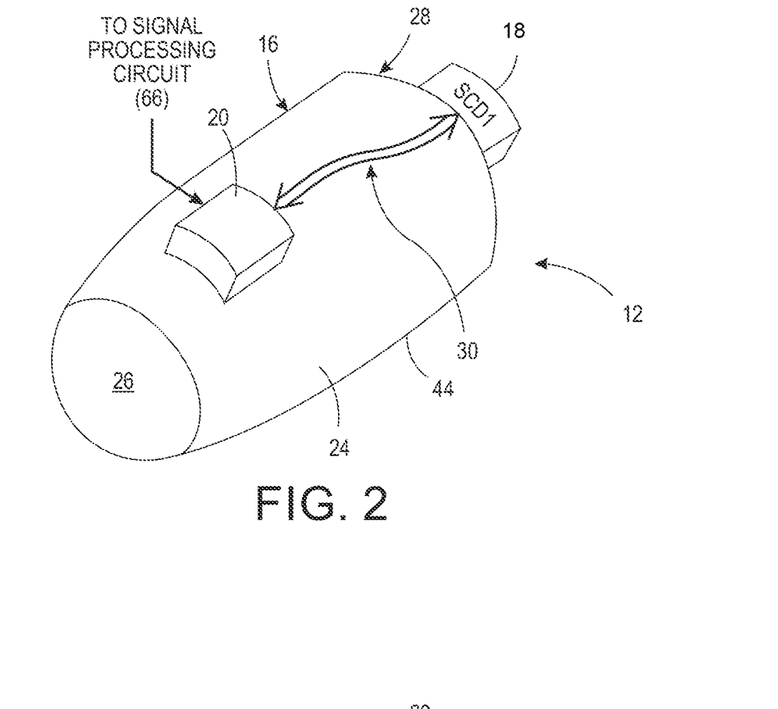
FIG. 2 is a schematic, perspective view of a first finger mountable subsystem.
Figure 3:
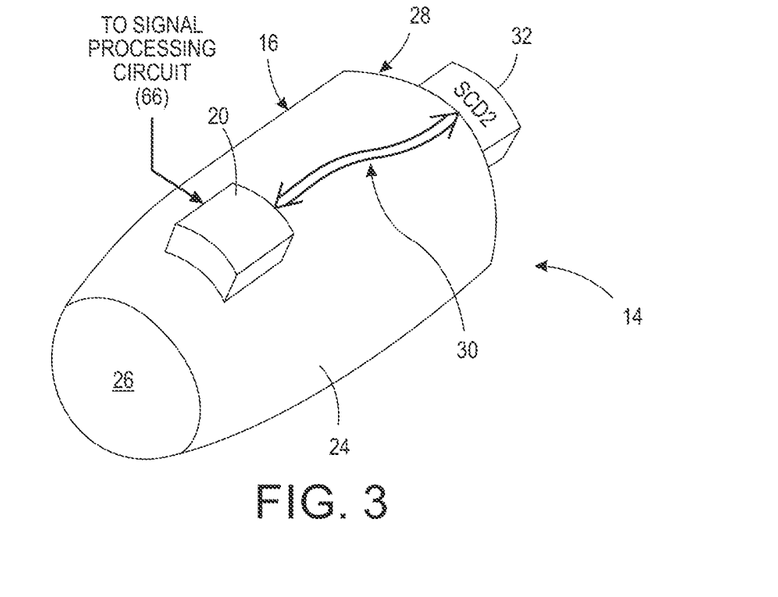
FIG. 3 is a schematic, perspective view of a second finger mountable subsystem.

Referring next to FIGS. 2 and 3, the respective structures of the subsystems 12 and 14 will be described. Referring first to FIG. 2, each finger based subsystem 12 includes an implement 16 upon which a first state changing device ("SCD1") 18 and interface 20 are mounted. In one example, the implement 16 includes a semi-rigid material adapted to fit over a fingertip and be held reasonably firmly in place on the fingertip. In the exemplary implementation of FIG. 2, the implement 16 is a hollow cylinder defined by a wall 24 having an opening 26 and a closed end 28. The dimensions of the implement 16 are such that it can fit over and be held snugly on a fingertip or thumb-tip. An example of a finger mounted implement suitable for use as the implement 16 of the presently disclosed wearable electronic musical system is described in U.S. patent application Ser. No. 15/381,434 to Bonner, which was previously incorporated by reference in its entirety.

As will appear, the SCD1 18 can assume a variety of forms and is shown in FIG. 2, for ease of viewing, as a black box. As will appear, the SCD1 18 can be implemented with one or more types of switches (or, alternatively, two or more types of sensors), and can be mounted along wall implement 24 and/or along implement closed end 28. As contemplated, SCD1 18 could include a multi-position switch, a push-button switch, an encoder, a hall-effect encoder, a roller-switch, a rocker switch, a scroll wheel, a scroll ball, a trackball, or joystick. Although various types of sensors could be similarly employed for sensing motion or pressure applied to the implement fitting over a user's finger. For example various forms of contact-type sensors could include force sensors (including stress or strain sensors), a capacitive, resistive or other touch-pad type sensors, heat or vibration sensors, whereas non-contact type sensors that may be used may include an accelerometer, light, infrared or other photometric sensors. Accordingly, the disclosed embodiments may suitably employ any one or a combination of switches or sensors provided that the movement, and in one embodiment, tapping or contact of a fingertip mounted subsystem 12 or 14, causes or results in the generation or change of a signal by the switch or sensor.

Electronic information, the significance of which will appear from the description below, is transmitted from SCD1 18 to interface 20 over line(s) 30. The interface 20 may include conventional firmware, such as a commercially available ASIC, with the ASIC including all of the logic and memory necessary to produce a suitable signal from the electronic information received by the interface 20 from either one of the subsystems 12 and 14.

Referring next to FIG. 3, each thumb based subsystem 14 includes an implement 16 (including a hollow cylinder defined by a wall 24 having an opening 26 and a closed end 28) with a second state changing device ("SCD2") 32 mounted along wall 24 and/or at closed end 28. Subsystem 14 also includes an interface 20 communicating with the SCD2 32 by way of line(s) 30. It will be appreciated by those skilled in the art that an interface 20 can be located at each finger implement and each thumb implement, or simply centralized by providing all of the necessary firmware for signal production with a single interface at each thumb.

Figure 4A:
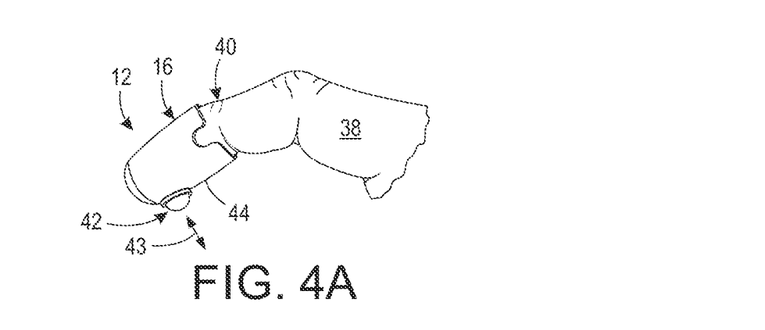
FIGS. 4A-4F are schematic, planar views respectively illustrating various approaches for implementing the first finger mountable system of FIG. 2.

Referring to FIGS. 2 and 4A-4F, various exemplary approaches for implementing the SCD1 18 on the finger based subsystem 12 are described. In FIG. 4A, the implement 16 is shown as secured on a finger 38 (with knuckle 40 shown for reference) with one of switches 42 mounted on an underside 44 of the implement 16, opposite the knuckle 40. In the example of FIG. 4A, the switch 42 is a binary push button switch (movable in the direction of arrow 43) and can be engaged when the underside 44 of the finger 38 contacts a solid surface.

Figure 4B:
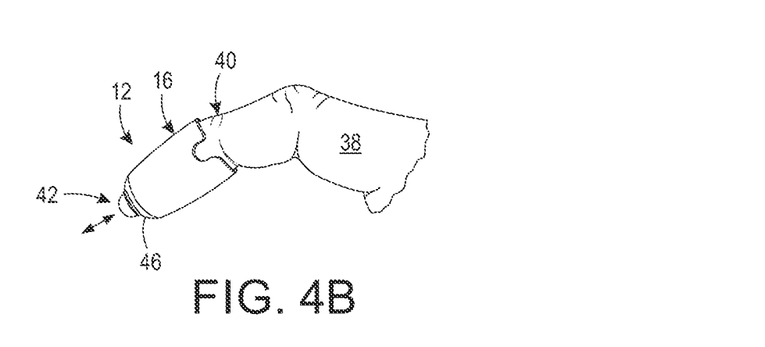
Figure 4C:
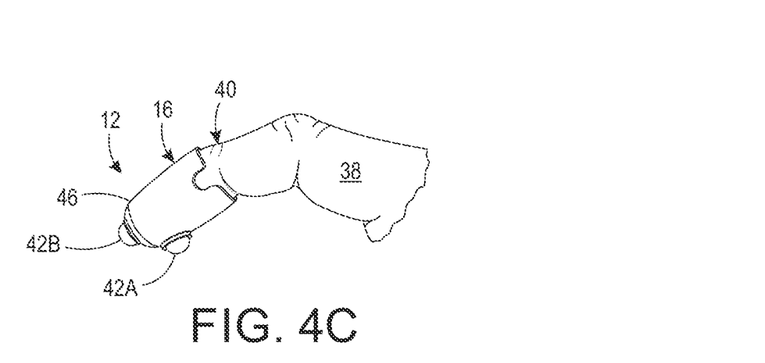

In FIG. 4B, the switch 42 is shown as being mounted on a tip 46 of the implement 16. Accordingly, the switch 42 of FIG. 4B can be engaged when the tip 46 of the finger 38 contacts the solid surface. In FIG. 4C, two of switches 42 (designated as switches 42a and 42b) are shown as being respectively mounted at implement underside 44 and implement tip 46. In the exemplary approach of FIG. 4C, engagement of the switches 42 can be achieved by tapping either the underside or tip of the finger 38 on the solid surface.

Figure 4D:
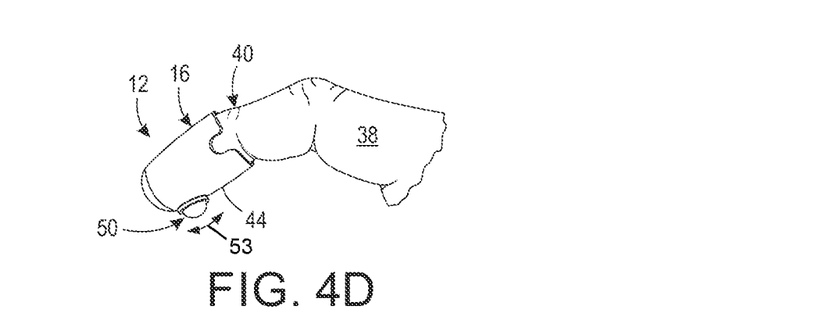
Figure 4E:
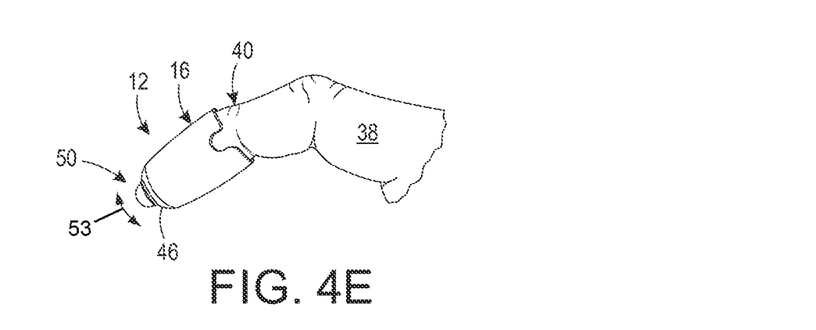
Figure 4F:
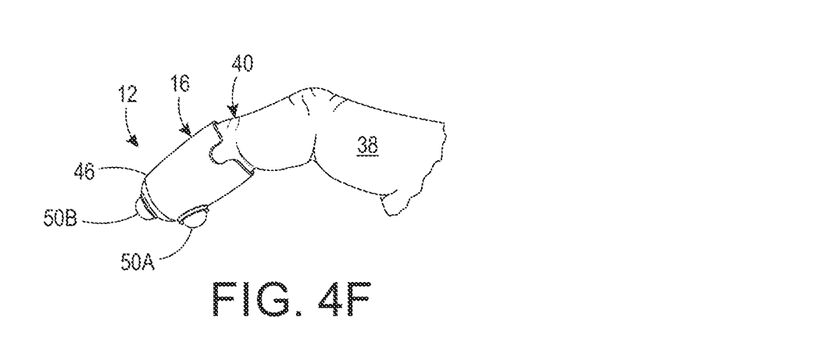

Referring to FIGS. 4D-4F, the implementations of FIGS. 4A-4C are respectively employed, except that, in each implementation, the switch 42 is replaced with a roller ball switch 50A, 50B having a roller ball 52 movable in the direction of arrow 53. As will appear from the description of operation below, variable electronic information (indicating, for instance, slight shifts in tonality) can be achieved with the roller ball switch 50 by simply rolling the roller ball along the solid surface.

Figure 5A:
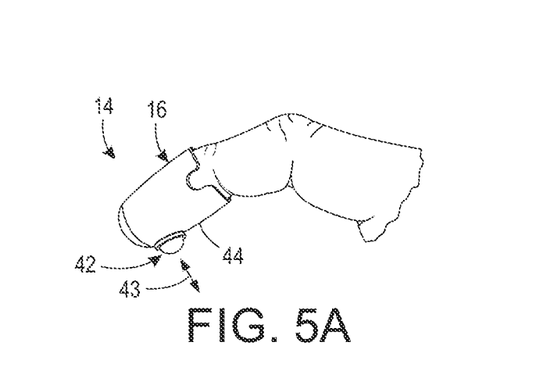
FIGS. 5A-5E are schematic, planar views respectively illustrating various approaches for implementing the second finger mountable system of FIG. 3.
Figure 5B:
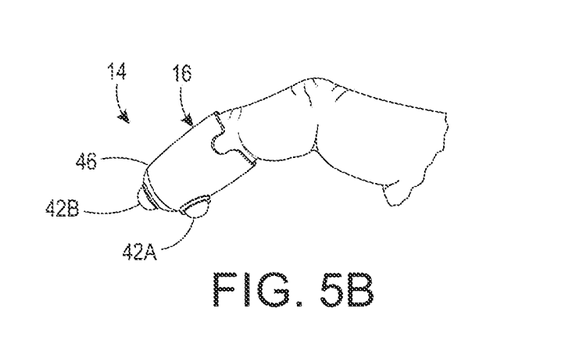
Figure 5C:
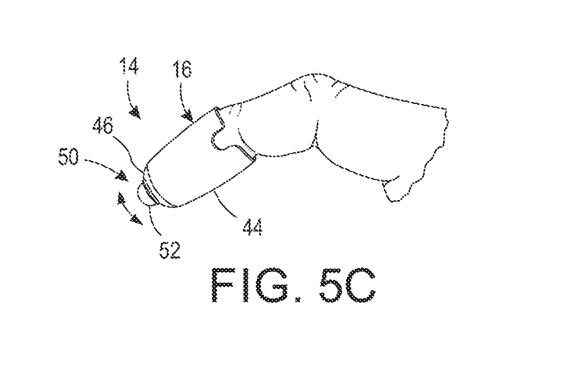

Referring to FIGS. 3 and 5A-5E, various exemplary approaches for implementing several types of the SCD2 32 on the thumb based subsystem 14 are described. The exemplary implementations of FIGS. 5A and 5B are structurally equivalent to the exemplary implementations of FIGS. 4A and 4B, respectively, while the exemplary implementation of FIG. 5C is structurally equivalent to the exemplary implementation of FIG. 4C. It will be appreciated that, for the thumb based subsystem 14, the roller ball switch 50 could also be mounted at the implement tip 46. Moreover, the present disclosure contemplates that the location for any one of the switches mounted on implement 16 could be varied to accommodate for the operational preferences of a given user.

Figure 5D:
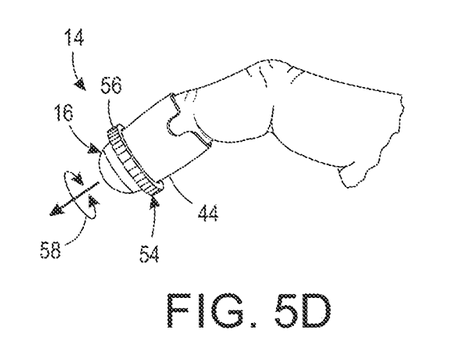

Referring specifically to FIG. 5D, a variation of the roller ball switch 50, designated by the numeral 54, is shown as being mounted to implement 16. The switch 54 employs a wheel actuator 56, which actuator 56 can be moved clockwise or counterclockwise in the directions of arrow 58. Variable states can be achieved by moving the wheel actuator 56 along a solid surface.

Figure 5E:
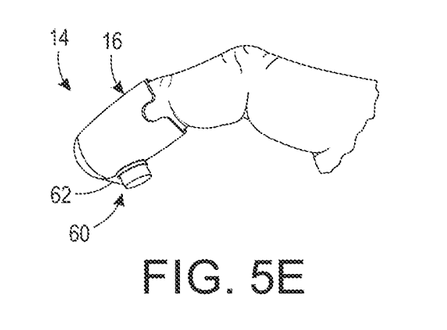

Referring specifically to FIG. 5E, a self-centering switch, designated by the numeral 60, is shown as being mounted along the implement underside 44. The switch 60 is shown in FIG. 5E as including a toggle actuator 62 and, in one exemplary implementation, the switch 60 could assume the form of a toggle switch with a rockable actuator of the type shown U.S. Pat. No. 3,299,224, the disclosure of which is incorporated herein by reference. As will be appreciated, one or more of the disclosed switches or sensors 42, 50, 60, may include a tactile feedback mechanism that, either through a mechanical member in the switch or via a tactile signaling mechanism, provides feedback to the user to indicate that the switch or sensor has been activated. For example, in the case of a rockable or movable actuator in switch 60, the rocking motion or depression of the switch may trigger an internal mechanism that is sensed by the user's digit (e.g., thumb), in order to provide the user with feedback that the position of the switch was changed. In the case where there is no tactile feedback generated by a component of the switch, for example in the case of a pressure sensing mechanism used on the thumb, a haptic feedback device may be employed with the sensor to provide the user with an equivalent sensation upon the system sensing a trigger of the sensor or switch.

In another example, the switch 60 could comprise a paddle switch ("or "Whammy Bar") of the type employed in a "Guitar Hero" guitar permitting a user to vary states by pushing the paddle one way or the other.

Figure 6:
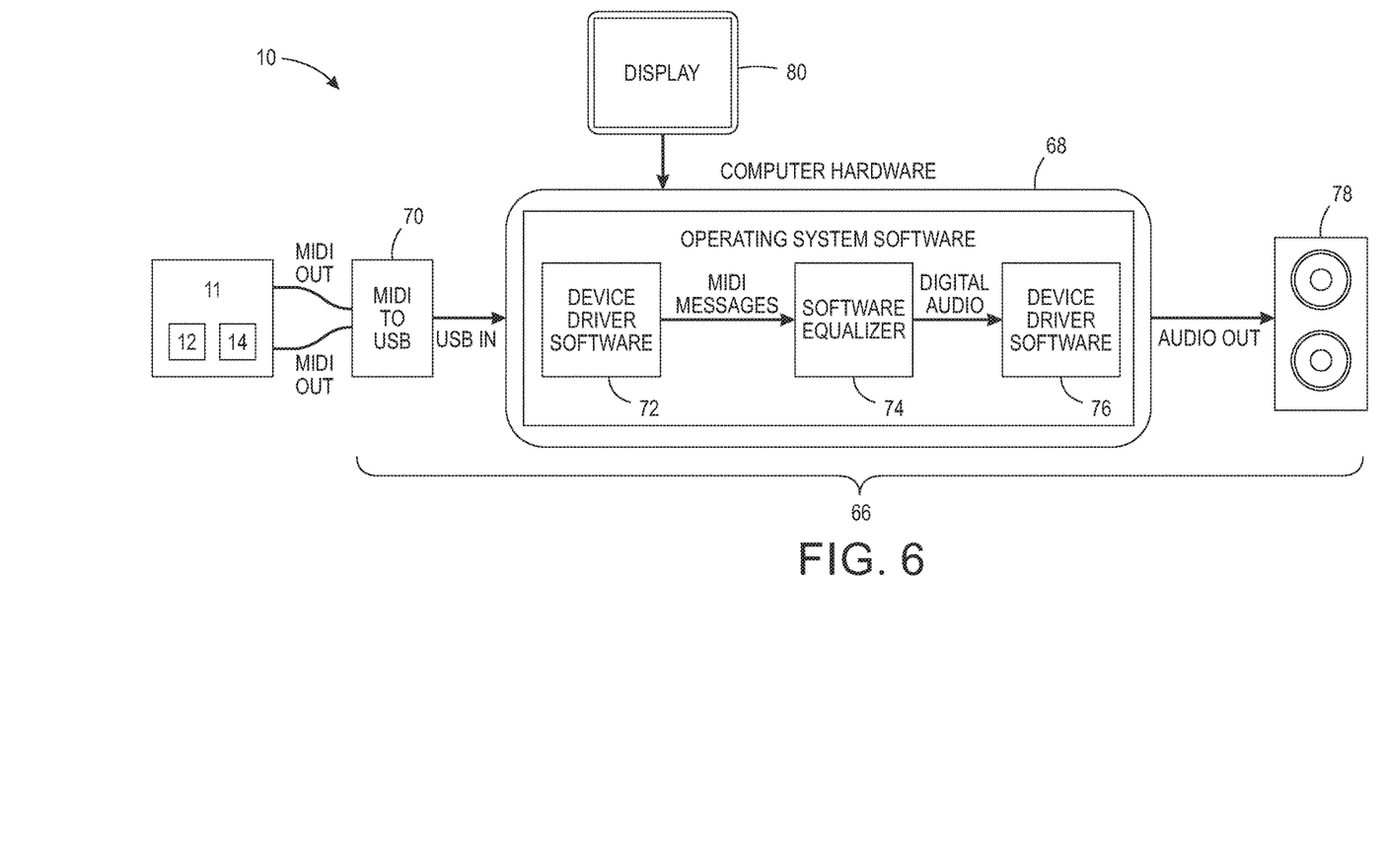
FIG. 6 is a block diagrammatic view of the wearable electronic musical system.

Referring to FIGS. 1 and 6, the signal processing system 66 for generating musical sounds, responsive to signals (e.g., "MIDI Messages") produced by the subsystems 12 and 14, is now described. In the exemplary approach of FIG. 6, the controller 11 comprises a MIDI controller communicating with a computer 68 by way of a suitable MIDI to USB interface 70. As further shown in FIG. 6, the computer 68 may be provided with device driver software 72, on the front end, for permitting MIDI Messages to be communicated to a software implemented synthesizer 74. In accordance with conventional technology, the software synthesizer generates tones, namely digital audio, corresponding with the MIDI Messages.

Although shown as a "wired" system, it is also contemplated that one or more the communication channels employed in system 66 may be a wireless channel as well (e.g., BlueTooth, WIFi, etc.). Furthermore, as depicted in FIG. 6, for example, the MIDI controller receives the signal(s) from subsystems 12 and/or 14, and communicates to an interface. Also contemplated is an embodiment where an electronic device having the capability and features of the MIDI controller 11 or its equivalent, and possibly of the MIDI to USB interface 70, is incorporated into one or more of the subsystems 12 or 14. For example, the subsystem 14, operatively attached to a user's thumb, could include both the switch(es) or sensor(s) associated with the thumb, along with the MIDI controller circuitry needed to receive signals from each of the subsystems 12 on the user's fingers as well. As will be appreciated, in such an embodiment the MIDI controller 11 would need a source of power, either from an associated power supply, which may be a wired connection (e.g., USB supplied power), or may be in the form of a battery or another portable supply for power.

In yet another variation of the embodiment depicted in the figures the functionality of the MIDI controller as well as other components of the disclosed processing system 66 may be implemented through the use of a computer or other processor in response to programmatic instructions. This software-driven system could create MIDI or other synthesizer inputs in response to signals from the subsystems 12 and 14. As an example, the signals from subsystems 12 and 14 may be received through conventional input/output (I/O) ports of the computer 68, transmitted via wired or wireless connections with the computer), and processed in a manner similar to that described to produce the MIDI or synthesizer information in response to the state changing device(s).

Referring to FIGS. 1-3, and 6, a manner in which a MIDI message may be generated can now be more fully understood. As the SCD1 18 of at least one of subsystems 12 is brought into contact with a solid surface, selected electronic information or data (corresponding to, for instance, finger designation and/or note duration) is produced. As explained in further detail below, in one preferred example of operation, generation of data from subsystem 12 is constrained by a given state of the SCD2 32 of subsystem 14. In turn, the selected data from the subsystem 12 is communicated to the interface 20, the interface 20 being preprogrammed to generate a MIDI Message. Each generated MIDI Message corresponds with one or more preselected digital audio outputs that are produced by the software synthesizer 74 in response to receiving the MIDI Message. Software tools for programming software synthesizers to correspond MIDI Messages with certain preselected outputs are available from the one of several software vendors. In response to the software synthesizer 74 producing digital audio output from the MIDI messages, a device driver software 76 permits consumable audio output to be delivered to an audio device 78. The audio device, in one example, can be speakers included with or operatively connected to the computer 68.

Figure 7:
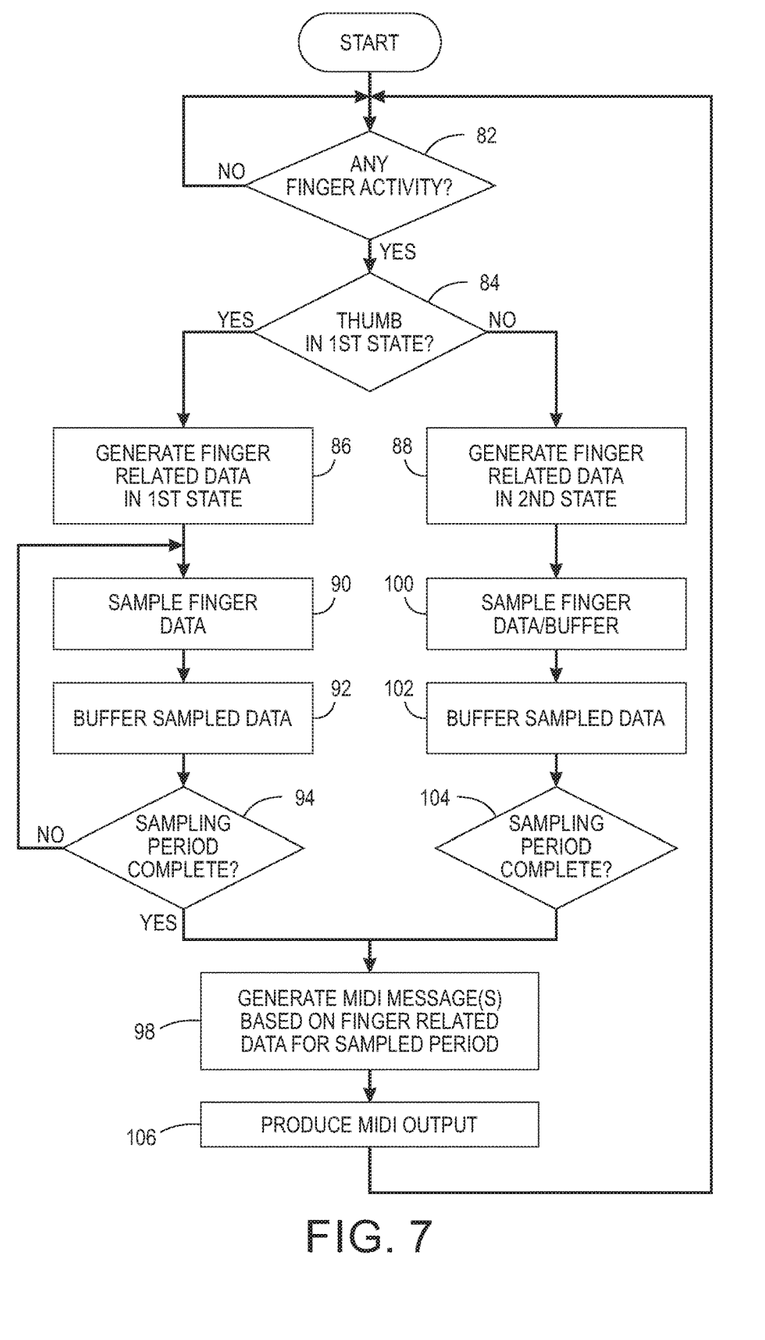
FIG. 7 is a flow diagram illustrating an exemplary process producing MIDI output(s) with the wearable electronic musical system.

Referring now to FIG. 7, a process for generating MIDI Messages with MIDI controller 11, and using the same, with the MIDI signal processing system 66 to produce corresponding musical sounds or outputs is described. As will be appreciated by those skilled in the art, the MIDI Messages are generated by collecting information or data from the subsystems 12, 14 and creating appropriate signals for consumption with the MIDI signal processing system 66. Moreover, the logic and short term memory necessary to generate the MIDI Messages is preferably obtained with the interface 20.

Referring initially to inquiry 82 of the flow diagram in FIG. 7, a check is performed to determine if one or more fingers (each including a SCD1 18) has contacted a solid surface, (i.e., is at least one finger active?). If at least one finger is active (i.e., at least one SCD1 18 has contacted a solid surface), then the process (as implemented with the interface 20), determines, at step 84, the current state setting of at least one of the SCD2s 32 of subsystems 14 (FIGS. 1 and 2). As follows from the above description of FIGS. 5A-5E, the state of each SCD2 32 can be set with one of the switches 42, 50, 54 and 60. In one example, obtaining the state of subsystem 14 for a given thumb permits finger related data for an associated hand to be generated in the context of a first state or a second state (step 86 or 88). To understand the significance of generating MIDI Messages in the context of one state or another, as well as the operation of the controller 11, reference is made to FIGS. 1, 2, and 7 along with the following example:

For FIG. 1, fingers (F1-F8) may be respectively assigned to the following musical outputs: A B C D E F G A. Note that the term "output," as used in the present disclosure, can refer to the output for a single musical note or the collective output a series of related notes, such as a musical scale (e.g., ABCD) or chord (e.g. AC). In the present example, when the SCD2 32 of subsystem 14, on thumbs T1-T2, is in a first state, the output may correspond to one of several octaves and, when SCD2 32 is in a second state, the output may correspond with another of several octaves. As contemplated, all of the octaves for a given keyboard instrument can be selected and generated with a given type of SCD2 32, such as a roller switch. In particular, as follows from FIG. 5D, the actuator 56 can be rolled along a solid surface to cause data from each subsystem 12 to be generated in the first state (starting at step 86) or the second state (starting at step 88). Alternatively, in one example, the switches 42a/42b of FIG. 5B can be configured to move tonal output either upscale (by continuously pressing of switch 42a), or downscale, (by continuously pressing switch 42b). Selection or alteration of the scale may be done in alternative ways as well. For example, the user may use a switch or sensor on the left hand to cause, upon each contact of a designated SCD (e.g., left thumb), an increase in scale and conversely a switch or sensor on the right hand to cause, upon contact, a decrease in scale.

Also contemplated, particularly where one or more switches or sensors may be employed to switch or shift scale, is an associated display 80 (FIG. 6), whereby one or more windows or portions of the display 80 may be used to illustrate the selected scale at any particular time. The intent of such a feature is to provide to the user an indication of which scale(s) the system is currently operating in. Similar visual feedback could be provided to the user using signaling lights (e.g., LEDs) that output different colors in response to the selected scale, or provide output at different positions as the scale is changed. As will be appreciated, such a system may also employ one or more conventional input devices such as a computer (e.g., ASCII) keyboard, mouse, touch-pad, touch-screen, control console, synthesizer interface, etc. to supplement the inputs available using the finger mountable subsystems 12 and 14. In summary a user's thumb or other digit may be used to manipulate (e.g., set or change) the key, octave setting, instrumentality (selected instrument(s)), as well as other settings that are provided in a conventional synthesizer interface (e.g., percussion beats, key shift, etc.). And, with a display 80 available, perhaps in the form of a touch-sensitive user interface such as found on a smartphone or tablet computer, the touch-sensitive input capability may also be employed for one or more of the noted selections, such as octave, key-settings, instrument(s) selection, etc. Such selections being immediately reflected via a corresponding display element. Moreover, as suggested above, such settings may be depicted in some manner on the display, including text, iconic representation and the like.

For the exemplary process of FIG. 7, data, generated as a result of at least some or all of fingers F1-F8 (with corresponding SCD1s 18) contacting a solid surface, is buffered with interface 20. That is, data is sampled at preselected intervals with the interface 20, and then buffered/processed at the same interface (step 92). As will be appreciated by those skilled in the art, the sampling interval should be granular enough to capture data corresponding with musical notes of varying duration (including notes with only a fractional duration of a whole note). Moreover, the sampling period should be frequent enough to capture a significant amount of data without creating undesirable gaps or "dead space" in resulting MIDI output. With suitable sampling, smooth reproduction of virtually all musical combinations (including sequential combinations or chords) should be obtainable. Suitable sampling should also permit high quality replication of fractional musical notes (namely musical notes with a duration of less than a whole note).

Referring still to FIG. 7, based on an inquiry at step 94, once data has been sampled and buffered over a preselected number of time intervals (i.e., a preselected sampling period), interface 20, at step 98, generates MIDI Messages for the buffered data. Note, the sub-process performed with steps 100, 102, 104 is equivalent to the sub-process performed with steps 90, 92 and 94, except that one sub-process is constrained by the first state, while the other sub-process is constrained by the second state. For either sub-process, MIDI Messages are generated from the buffered data and, per step 106 MIDI output is produced using the software synthesizer of computer 68 (step 98). In one example of operation, the process of FIG. 7 can be used to conveniently create musical output in one state (possibly a scale in one octave)—by merely contacting a solid surface with SCD2 32 and then any one(s) of SCD1s 18)—and then in another state—by merely contacting the solid surface again with SCD2 32 and any one(s) of SCD1s 18.

It will be appreciated that, in accordance with the use of MIDI technology, many different types of outputs can be assigned to the subsystems 12 so that, for instance, the two hands of FIG. 1 could even be used to replicate multiple instruments. Moreover, the subsystem 14 can be used to expand and contract the dynamic range of output(s) generated with the subsystems 12. In the above example, where the fingers are organized as a scale, the subsystems permit programmable tonal separation between a first scale and a second scale by simply tapping one of the SCD2s 32 on a solid surface a desired number of times. Other combinations using the subsystems 12 and 14 can be envisaged. For instance, in a first state, one hand might represent the notes of an instrument bass section while, in a second state, another hand might represent the notes of a treble section of another instrument.

It will be appreciated that various of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A wearable electronic music system, comprising:
a plurality of first finger mountable implements, each one of the first finger mountable implements being configured to fit over a fingertip and having at least one surface engageable element operatively connected thereto, said surface engageable element changing an output signal only while said surface engageable element is in contact with a surface;
at least one second finger mountable implement configured to fit over a fingertip and having at least one state altering element operatively connected thereto, the at least one state altering element being disposable in one of at least a first state and a second state, said state altering element changing an output state as a result of contact with the surface; and
a sound producing subsystem operatively communicating with said plurality of first finger mountable implements and said at least one second finger mountable implement, said sound producing subsystem responsive to both the contacting of at least one surface engageable element, operatively connected to at least one of said plurality of first finger mountable implements on a solid surface and the at least one state altering element being disposed in one of at least the first state and the second state, wherein (a) when the at least one state altering element is disposed in the first state, said sound producing subsystem causes a first output to be produced as the at least one of said plurality of first finger mountable implements contacts the solid surface, and (b) when the at least one state altering element is disposed in the second state, said sound producing subsystem causes a second output to be produced as the at least one of said plurality of first finger mountable implements contacts the solid surface.

2. The wearable electronic music system according to claim 1, wherein the at least one surface engageable element comprises one of a switch and sensor.

3. The wearable electronic music system according to claim 2, in which said sound producing subsystem causes each one of the first output and the second output to be produced in one of a plurality of musical note durations, wherein the output signal of one of the switch and sensor, is used to control the musical note durations by said sound producing subsystem in causing the first and second outputs to be produced.

4. The wearable electronic music system according to claim 1, wherein the at least one state altering element comprises at least one of a switch, a multi-position switch, an encoder, a hall-effect encoder, a roller-switch, a scroll wheel, a scroll ball, a trackball, a joystick, and a sensor.

5. The wearable electronic music system according to claim 4, in which the multi-position switch includes a first button for changing state in one direction and a second button for changing state in another direction, wherein pressing the first button causes a downscale movement in tonal output and pressing the second button causes an upscale movement in tonal output.

6. The wearable electronic music system of 5, wherein contacting the state altering element once on the solid surface causes the at least one state altering element to change states.

7. The wearable electronic music system according to claim 1, wherein said plurality of first finger mountable implements and said at least one second finger mountable implement are part of a musical instrument digital interface ("MIDI") controller, and wherein said sound producing subsystem comprises a MIDI synthesizer.

8. The wearable electronic music system according to claim 7, wherein the at least one surface engageable element comprises a piezo-electric sensor.

9. The wearable electronic music system according to claim 1, wherein the first output comprises at least one of a first set of musical notes and the second output comprises at least one of a second set of musical notes, and wherein the first set of musical notes is separated from the second set of musical notes.

10. The wearable electronic music system according to claim 1, wherein (a) said plurality of first finger mountable implements are configured for use with two or more fingers where the two or more fingers do not include a thumb, and (b) said at least one second finger mountable implement is configured for use with just one or both of two thumbs.

11. The wearable electronic music system according to claim 1, wherein the at least one state altering element includes a movable member with movement of the movable member resulting in the disposal of the at least one state altering element into an alternative one of a plurality of states.

12. The wearable electronic music system according to claim 11, wherein the movable member comprises a roller ball movable in one of a first direction and a second direction, wherein when the roller ball is moved in the first direction the at least one state altering element is changed to a next state in a first direction, and when the roller ball is moved in the second direction the at least one state altering element is changed to a next state in a second direction.

13. The wearable electronic music system according to claim 11, wherein the movable member comprises a rotatable wheel movable in one of a first direction and a second direction, wherein when the rotatable wheel is moved in the first direction the at least one state altering element is changed to a next state in a first direction, and when the rotatable wheel is moved in the second direction the at least one state altering element is changed to a next state in a second direction.

14. The wearable electronic music system according to claim 11, wherein the movable member is a rocker switch disposable in one of a first position and a second position, wherein when the rocker switch is disposed in the first position the at least one state altering element is disposed in the first state, and when the rocker switch is disposed in the second position the at least one state altering element is disposed in the second state.

15. A wearable user input device, for selectively producing a first musical output and a second musical output, in response to at least one of a user's digits contacting a solid surface, comprising:
first, second and third implements for attachment to three respective ends of a user's digits;
first, second and third surface engageable elements respectively mounted on the first, second and third implements;
said first surface engageable element being selectively engageable to generate one of a first signal and a second signal;
wherein, in response to the first signal being generated with said first surface engageable element, a third signal and a fourth signal are respectively generated in response to the user's second and third digits contacting the solid surface;
wherein, in response to the second signal being generated with said first surface engageable element, a fifth signal and a sixth signal are respectively generated in response to the user's second and third digits contacting the solid surface; and
a sound producing subsystem, operatively communicating with said first, second and third implements, for selectively producing, in response to at least two of the first through sixth signals, a corresponding musical output.

16. A wearable electronic music system, comprising:
a musical instrument digital interface ("MIDI") controller including:
a plurality of first finger mountable implements, each one of the first finger mountable implements being configured to fit over a fingertip and including at least one surface engageable element connected thereto, each surface engageable element causing a MIDI message to be created upon contact with a surface, wherein said plurality of first finger mountable implements are configured for use with two or more fingers where the two or more fingers do not include a thumb, and
at least one second finger mountable implement configured to fit over a fingertip and including at least one state altering element, the at least one state altering element being disposable in at least one of a first state and a second state, wherein said at least one second finger mountable implement is configured for use with just one or both of two thumbs;
a synthesizer operatively communicating with said MIDI controller to receive one or more MIDI messages, said synthesizer being responsive to both the contacting of a first set of two or more first wearable implements on the surface and the at least one state altering element being disposed in one of the first state and the second state;
wherein (a) when the at least one state altering element is disposed in the first state, said synthesizer causes a first musical output to be produced as at least one of the plurality of first finger mountable implements contacts the surface, and (b) when the at least one state altering element is disposed in the second state, said synthesizer causes a second musical output to be produced as at least one of the plurality of first finger mountable implements contact the solid surface; and
wherein the first musical output is distinct from the second musical output by at least one musical note.

17. The wearable electronic music system of claim 16, wherein each surface engageable element comprises a piezoelectric sensor, and wherein the at least one state altering element includes one of a binary switch and a pressure sensor with the contacting of the one of the binary switch and pressure sensor on the solid surface causing a transition from the first state to the second state.

18. The wearable electronic music system according to claim 16, wherein the at least one state altering element includes a movable member with movement of the movable member resulting in the disposal of the at least one state altering element into one of the first state and the second state.

19. The wearable electronic music system according to claim 18, wherein the movable member comprises one of a roller ball, rotatable wheel and rocker switch.

20. The wearable electronic music system according to claim 16, wherein the first musical output is tonally separated from the second musical output.

* * * * *